Nov. 10, 1964    M. J. DE GOOD    3,156,345
MOTOR POWERED ACCUMULATING CONVEYOR
Filed June 23, 1961    3 Sheets-Sheet 1
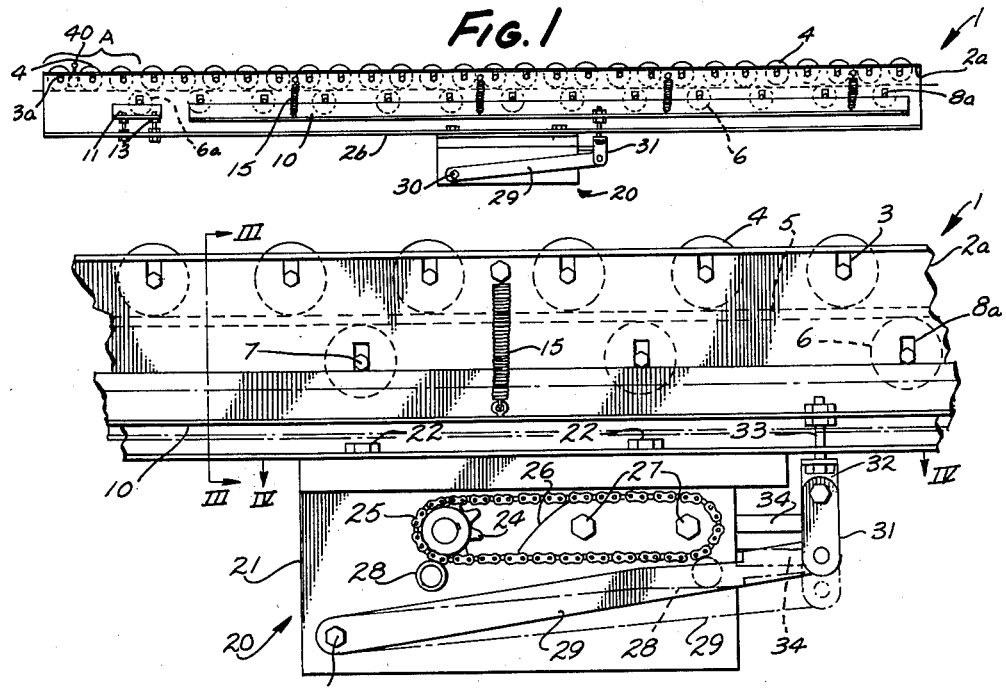
FIG. 1
FIG. 2
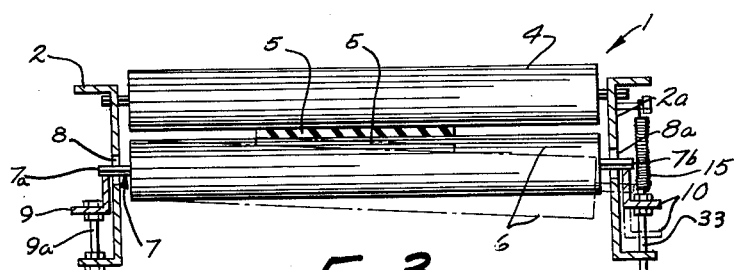
FIG. 3
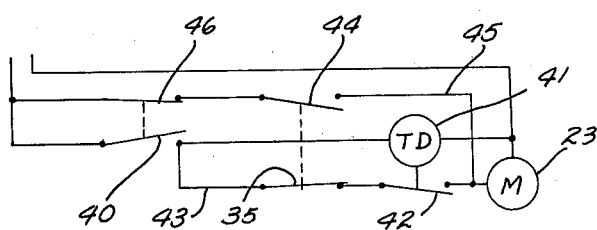
FIG. 5
INVENTOR.
MAYNARD J. DE GOOD
BY
ATTORNEYS Nov. 10, 1964  M. J. DE GOOD  3,156,345
MOTOR POWERED ACCUMULATING CONVEYOR
Filed June 23, 1961  3 Sheets—Sheet 2
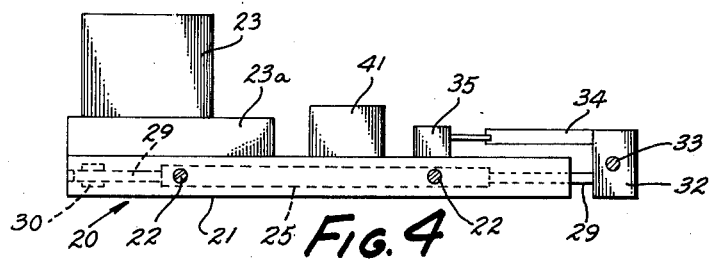
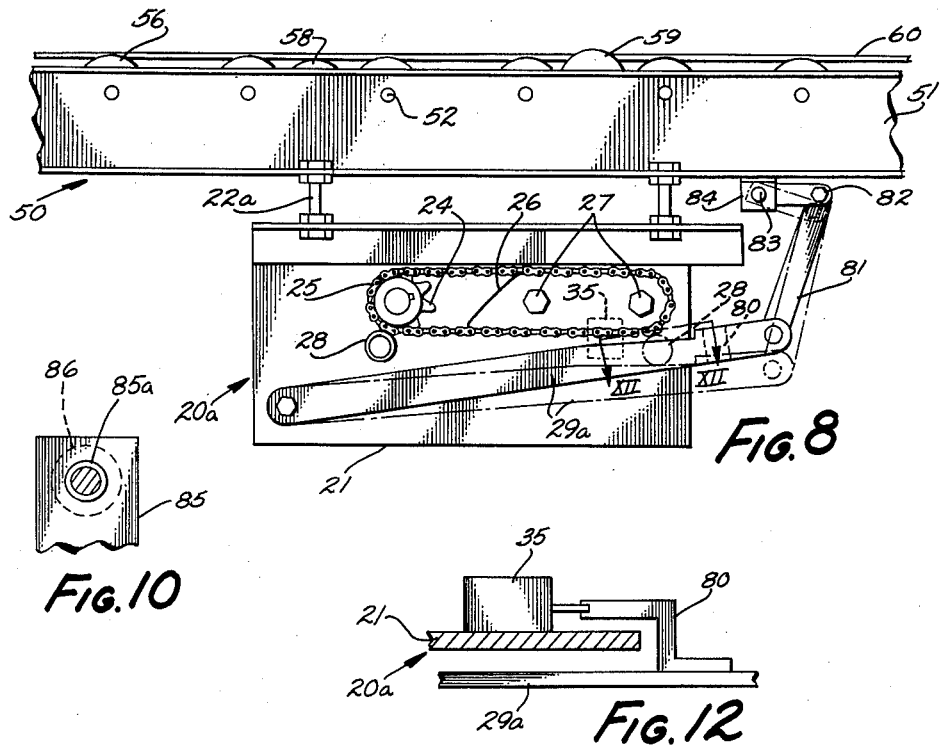
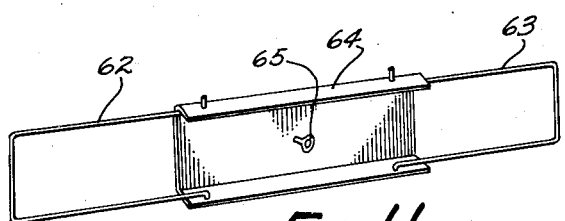
INVENTOR.
MAYNARD J. DE GOOD
BY
ATTORNEYS Nov. 10, 1964        M. J. DE GOOD        3,156,345

MOTOR POWERED ACCUMULATING CONVEYOR

Filed June 23, 1961                                  3 Sheets-Sheet 3

INVENTOR.
MAYNARD J. DE GOOD
BY
ATTORNEYS

United States Patent Office 3,156,345
Patented Nov. 10, 1964

3,156,345
MOTOR POWERED ACCUMULATING
CONVEYOR
Maynard J. De Good, Grand Rapids, Mich., assignor to
The Rapids-Standard Company, Inc., Grand Rapids,
Mich., a corporation of Michigan
Filed June 23, 1961, Ser. No. 119,109
13 Claims. (Cl. 198—127)

This invention relates to conveyors and more particularly to an accumulation type conveyor particularly designed for handling articles of a wide range of weight in random sequence.

Due to the increasing usage of conveyors for functions other than the simple transportation of articles, it now frequently occurs that articles are temporarily stored on conveyor lines for short periods of time in substantial numbers. This normally occurs when an obstruction such as a gate is placed in or across the conveyor. When this occurs, the articles accumulate on the conveyor in substantial numbers behind the obstruction and are held stationary. This does not pose serious problems in the case of gravity conveyors but where power conveyors are involved, the articles resting in large numbers on the driven members of the conveyor which normally propel the articles increase the load which the driving mechanism of the conveyor must sustain. This is true whether the conveyor has a belt or rollers as the article propelling means. The stationary articles, collectively, offer substantial resistance to the movement of the driven propelling means, thus substantially increasing the load on the prime mover as well as on the power train, shafts, and rollers involved. Of course it is entirely possible to turn off the conveyor's prime mover during such periods but such is not normally practical.

The practical answer to this problem is to disengage the driven propelling means from the articles or from the rollers which propel the articles while the articles are stationary. This permits the main propelling member to continue to operate but free of the load that would otherwise be imposed by the stationary articles.

Conveyor means have been devised which accomplish this purpose. These conveyor means work very satisfactorily with articles of medium or heavyweight and may be made to work satisfactorily with lightweight articles. However, when they are adjusted to positively react to the weight of a light article, they are not capable of exerting sufficient propelling force against heavy articles to assure their transportation. Most conveyors are used to transport numerous types of articles varying widely in size, weight, and ease with which they move along the conveyor track. Further, in most cases the pressure necessary to actuate them is proportional to the pressure they exert to urge the propelling member into engagement with the article. Therefore, where particularly lightweight articles are involved, the reduction of the pressure necessary to assure actuation of the sensing devices may be such that insufficient pressure is maintained to transport the articles. To reverse is also true. That is, where the pressure exerted against a propelling member is sufficient to assure transportation, the forces necessary to cause disengagement of the propelling member may be in excess of that which the article can provide and thus the article, in effect, becomes hung up on one of the sensing or actuating units because it lacks sufficient weight to actuate it. This problem becomes much more troublesome when the articles are extremely lightweight or their configuration requires an unusually high propelling force to assure movement.

This situation becomes particularly serious in accumulation conveyors transporting, in random sequences, articles of a wide range of weights. When such articles pile up behind an obstruction and the propelling forces are not released, they are crushed together by the forces exerted by the propelling member building up what is termed "line pressure." When assorted types of articles are being conveyed, even small line pressures will cause crushing and buckling of the smaller items.

It is in this particular situation that present accumulator conveyors experience difficulty. The limitation of present accumulation conveyors that approximate minimal line pressure is one of range of weight of items that can be conveyed and still have the sensing mechanism operative to release line pressure. If the sensing mechanisms are adjusted to accommodate very lightweight items, the conveyor then has a critical limit of the maximum weight of an item it can convey. This limitation is significant in instances in which the conveyor is required to convey, in random sequence, items in a wide range of weights. This limitation becomes especially critical when reduction of line pressure is required to that necessary to prevent "jackknifing" and crushing of fragile items.

This invention has, as its primary object, the elimination of these limitations. It provides a conveyor which can be adjusted to accommodate the lightest weight item and yet will positively transport much heavier items. In fact, the upper weight limit is established by the structural capacity of the conveyor and the total power applied to the propelling member.

This invention provides such a means which is both simple and so designed that it may be applied to both new equipment and to existing installations. It is designed to require only simple installation procedures and a minimal of adjustment to put it into operation. It also provides a structure which is substantially free of functional failure and thus is dependable. At the same time, it is completely automatic and requires no supervision by an operator. In fact, it will function well as an integral part of a fully automated system.

It is so designed that it does not respond to the routine transportation of articles. It will only become operative when articles becomes stationary. Thus, it only responds to those circumstances which require its operation.

These and other objects and purposes of this invention will be immediately understood by those acquainted with materials handling equipment upon reading the following specification and the accompanying drawings.

In the drawings:

FIG. 1 is a side elevational view of a power roll conveyor equipped with this invention but omitting all of the details of the activator unit except the linkage.

FIG. 2 is an enlarged fragmentary view of the actuating unit for this invention applied to a power roll conveyor;

FIG. 3 is an enlarged sectional elevational view taken along the plane III—III of FIG. 2;

FIG. 4 is a sectional plane view taken along the plane IV—IV of FIG. 2;

FIG. 5 is a schematic wiring diagram of the control circuitry for this invention;

FIG. 8 is an enlarged fragmentary view of the actuating unit of this invention as applied to the conveyor illustrated in FIG. 7;

FIG. 10 is a fragmentary sectional elevational view taken laterally of the conveyor showing the engagement between the cable in FIG. 9 and the finger provided for actuating the cable.

FIG. 11 is an oblique view of the lower face of the connecting linkage used in the conveyor illustrated in FIG. 7;

FIG. 12 is a fragmentary sectional view taken along the plane XI—XI of FIG. 8;

Figure 7:
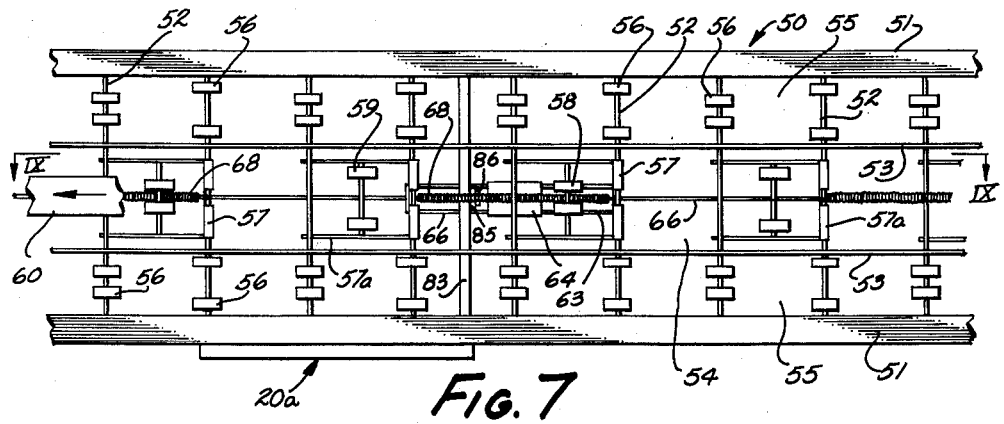
FIG. 7 is a fragmentary plan view of this invention applied to a conveyor equipped with a narrow center belt as the propelling member.

In executing the objects and purposes of this invention, there has been provided a conveyor having a short section at its discharge end which is constantly under power. The length of this section is approximately that which is sufficient to accommodate a single article. Within this section is a switch of such sensitivity that it may be readily actuated by even the lightest weight article. This switch is connected with a time delay device whereby the effect of the actuation of the switch is delayed for a predetermined period of time such as several seconds. If the switch remains actuated throughout this period, a circuit is completed which initiates the operation of a motor. The motor in turn causes the means which supports the main propelling member in article propelling position to be lowered whereby the propelling member disengages all articles on the conveyor except the one article in the area where the switch is located.

The motor will stop at a position where the propelling member is held in disengaged or lowered position and will not re-initiate operation until the package resting on the switch has moved on. When this occurs, the motor will again operate for a sufficient length of time to permit the support means for the propelling member to rise into its normal position, restoring propelling engagement with the articles on the conveyor. In the case of power roll conveyors, the device effects disengagement between the driving belt and the powered or driven rollers so that they are no longer positively driven. In the case of the narrow belt type conveyor, the device lowers the belt where it will disengage the articles.

Referring specifically to the drawings and to FIGS. 1, 2 and 3, the numeral 1 indicates a powered roll conveyor having a pair of side frame members 2 and 2a. At regularly spaced intervals adjacent the top, the side frame members are provided with vertical slots 3 into which seat the ends of the axles for the driven rollers 4. In this type of conveyor, the driven rollers 4 form the conveying surface of the conveyor.

As best seen in FIG. 3, beneath the driven rollers 4 is a belt or propelling member 5. It is driven by any suitable means such as the prime mover and drive assembly 100.

The belt is supported by pressure rollers 6. Each of the pressure rollers 6 is rotatably mounted on a shaft 7, the ends of which project through vertical slots 8 in the side frame member 2 and 8a in side frame member 2a. The ends 7a of the shafts 7 which project through the slots 8 are supported by a rail 9 (FIG. 3). The rail 9 is secured to the lower flange of the side frame member 2 by bolts 9a. The bolts 9a permit vertical adjustment of the rail 9 to a proper operating height. However, once this adjustment has been made, the vertical position of the rail 9 remains fixed.

In side frame member 2a, the slot 8a is so located that when raised to operative position, the end 7b of the shaft is spaced from both ends of the slot, permitting the shaft to move vertically in the slot and particularly downwardly from operative position. The end 7a of the shaft, exteriorly of the side frame member 2a, is supported on an angle bar or roil 10. The rail 10 runs the length of the conveyor section except for a short length of the conveyor at its discharge end, which is generally designated as zone A in FIGS. 1 and 6. This statement is true only when a single length of this conveyor is used. Where, however, several lengths of the conveyor are arranged in tandem, a somewhat different arrangement is used as will be explained subsequently.

In zone A the shaft 7 of the pressure roller 6a is mounted in the same way except it is supported by a short length of angle 11 which, in turn, is supported for vertical adjustment by a pair of studs 12 equipped with adjustment nuts 13. The angle 11, once set to effect proper contact between the belt 5 and the driven rollers 4 above, remains stationary and does not vary its position as does the rail 10. The purpose of this structure is to provide positive propelling force on the lead article assuring its removal from the conveyor as soon as the obstruction is removed.

The rail 10 is urged into a raised position by springs 15. In raised position, it is supported at a substantial distance above the lower flange 2b of the side frame member. It also raises the ends 7a of the shafts supporting the pressure rollers 6 such that the pressure rollers 6 urge the belt 5 into driving engagement with the driven rollers 4. In this position all of the driven rollers are actively engaged by the belt 5 and thus are powered.

The vertical position of the rail 10 is controlled by the actuating unit 20. The actuating unit 20 has a main frame 21 which is secured to and depends from the side frame member 2a. It is attached to the angle member 2a by bolts 22. Secured to the frame 21 is a motor 23 (FIG. 4) which drives a sprocket 24 (FIG. 2) either directly or through a speed reducer 23a, depending on the speed of the motor. The sprocket 24 drives an endless chain 25. At its other end, the chain 25 passes about a guide plate 26 which serves the function of an idler sprocket and also, along the lower run of the chain, supports the chain against upward movement. The guide plate 26 is secured to the frame 21 by a pair of bolts 27.

Mounted on the chain is a single roller dog 28. The dog projects outwardly from the chain and once during each revolution of the chain operates against the lever 29. The lever 29 at one end is pivotally secured to the frame 21 by a pin or bolt 30. At its other end the lever 29 is pivotally secured to the link 31 which in turn is attached to the fitting 32. The fitting 32 has a bolt 33 which passes through a clearance opening in the lower flange 2b of the side frame member 2a and is rigidly secured to the lower flange of the rail 10.

The lever 29 has an elongated notch 33 in its upper face located in the area of contact with the dog 28. The notch is so shaped that its lower edge is horizontal when the lever 29 is depressed. Thus, it permits substantial travel of the dog 28 while holding the lever in fully depressed position. This permits the dog 28 a reasonable amount of travel along its path while holding the lever 29 depressing and reduces the criticalness of timing of the stopping of the motor 23.

Thus, it will be seen that each time the dog 28 passes the lever 29 the lever is forced downwardly, pulling the rail 10 downwardly with it. This in turn permits the rollers 6 to drop, disengaging the belt 5 from the adjacent driven rollers 4. Also secured to the fitting 32 is a bar 34 which actuates a switch 35 (FIG. 4). The purpose of the switch will be described subsequently.

In the power zone A is a switch 40 (FIGS. 1 and 6) which preferably is supported on a suitable bar 39 adjacent the center of the conveyor and has a switch arm projecting above the top surface of the driven rollers 4a of the powered section of zone A. This switch is so designed that even the lightest article moving along the conveyor will exert sufficient weight on the switch arm to actuate the switch. The switch 40 is normally open. However, when a package passes over it, the switch is tripped and thereby closed. This closes a circuit to the time delay mechanism 41 (FIG. 4).

The time delay mechanism 41 is so set that it will not actuate during the normal period required for an article to pass over the switch 40. Thus, if an article, in the normal operation of the conveyor, passes over the switch 40, closes it, and passes on permitting the switch 40 to reopen, the time delay mechanism 41 will generate no signal. If however, the package remains on the switch 40, keeping it closed in excess of the predetermined period of time, an interval such as three or five seconds, the time delay mechanism 41 will close the switch 42 (FIG. 5). This will actuate the motor 23 which drives the chain 25.

Assuming that the dog 28 on the chain 25 is in the position illustrated in FIG. 2, the movement of the chain will move the dog clockwise until it contacts the link 29 and forces it downwardly. As it does, the bar 34 is moved downwardly, opening the normally closed switch 35 (FIGS. 4 and 5), interrupting the circuit 43 controlling the operation of the motor 23. This will stop the dog 28 where it is holding the link 29 in depressed position, retaining the pressure rollers 6 in lowered position, dropping the belt 5 away from the driven rollers 4. Therefore, all propelling force against the articles on the conveyor is eliminated except in the short zone A at the discharge end of the conveyor.

At the same time that switch 35 is opened, switch 44 will automatically be closed in by-pass circuit 45. Switches 35 and 44 are coupled for simultaneous action. This, however, will not activate the motor since the switch 46, also incorporated in this circuit, will have automatically been opened by the closing of the switch 40. Switches 40 and 46 are also coupled for simultaneous operation. As soon as the package resting on the switch 40 is permitted to move on, releasing switch 40, it will automatically open and switch 46 will once again be closed. Since switches 46 and 44 are now both closed, the motor 23 will be actuated by the by-pass circuit 45. The motor will continue to operate until the dog 28 reaches the approximate position shown in FIG. 2. At this point, the bar 34 having returned to its original position, switch 44 will open and switch 35 will close. This interrupts power to the motor 23 since the by-pass circuit 45 is interrupted and the main motor circuit 43 is also interrupted because the earlier opening of switch 40 has caused the time delay mechanism 41 to reopen switch 42. At this point, the circuit is reset for the next occasion during which a package or article rests for a sufficient length of time on switch 40 to activate the time delay mechanism 41. With removal of the dog 28, the spring 15 will raise the rail 10 and carry the lever 29 with it. Thus, the actuator 20 only has to lower the rail and lever 29, it does not have to supply the power to raise them.

FIGS. 7 through 10 illustrate the application of this invention to a conveyor equipped with a narrow, article propelling belt mounted in the conveying surface of the track. In this case the articles are partially transported on the conveyor wheels which flank the belt and partially on the belt itself.

In this construction the conveyor 50, as shown in FIG. 7, has a pair of side rails 51 which are connected at periodic intervals by axles 52. The axles are equally spaced along the conveyor. Additional connections between the side frame members 51 will be provided, but this is not shown since it is conventional and is not part of this invention. Extending along the conveyor are a pair of center bands 53. The axles 52 pass through these bands which are spaced apart to form a medial lane 54. The bands 53 are also spaced from the side rail members 51, creating flanking lanes 55. Within the flanking lanes 55, conveyor wheels 56 are mounted for free rotation about the axles 52 in a pattern and spacing suitable for the type of articles to be transported along the conveyor.

Within the medial lane 54, hangers are pivotally seated over certain of the axles 52 and depend from the axles beneath the surface of the conveyor. In the particular arrangement illustrated in FIG. 7, alternate hangers 57 mount belt supporting wheels 58. The other hangers 57a mount sensing or article detecting wheels 59. The belt supporting wheels 58 are spaced closely together and serve as the only support for the article propelling belt 60. They support the belt 60 in a normal, operating position generally flush with the top surfaces of the conveyor wheels 56.

The sensing or article detecting wheels 59 are spaced further apart, permitting them to extend up on each side of the belt 60 a short distance above the top surface of the belt where they will be engaged and depressed by articles passing along the conveyor. Each of the hangers 57 is interconnected with a hanger 57a by a linkage assembly 61 joining an operating unit. Each of these operating units is urged in operative or raised position by a spring 68. One end of this spring is attached to hangers 57 and the other end to one of the axles 52. In each operating unit the hanger 57a is located downstream of the connected hanger 57 with regard to the direction of movement of the conveyor. By reason of the linkage assembly, each pair of hangers 57 and 57a are interconnected for simultaneous movement. Thus, when a package passes over one of the sensing wheels 59 of an operating unit and depresses it, by reason of its weight, to the level of the belt 60, the hanger 57a supporting these wheels is caused to pivot and this motion is transmitted to the interconnected hanger 57 which also pivots. Since the wheels 59 of the hanger 57a are mounted on the same side of the hanger as the wheels 58 of the hanger 57, the downward swinging movement of the wheels 59 will be reproduced in the wheels 58, thus permitting the belt 60 to drop and disengage any article which happens to be on the conveyor in the vicinity of that hanger. Downward movement of the article is prevented since it will come to rest on the top surfaces of the conveyor wheels 56 in the flanking lanes 55.

As best seen in FIG. 11, the linkage assembly consists of a pair of U-shaped links 62 and 63, one adapted to be secured to the hanger 57a and the other to the hanger 57. These are joined by a plate 64. Depending beneath the plate is a ring 65. Slidably passing through this ring is a cable 66 (FIG. 9) which interconnects all of the linkage assemblies 61 of all of the hangers in the area of the conveyor to be actuated by this invention. On one side of each of the rings 65, the cable 66 is equipped with a stop 67 which is rigidly affixed to the cable. Thus, if the cable is moved so that the stop 67 is brought to bear against the ring 65, the ring 65 will be moved with the cable. However, the ring 65 provides a large clearance opening for the cable 66 and thus the ring may move away from the stop 67 without interference from the cable. The purpose of this will be made clear in a subsequent description.

Figure 9:
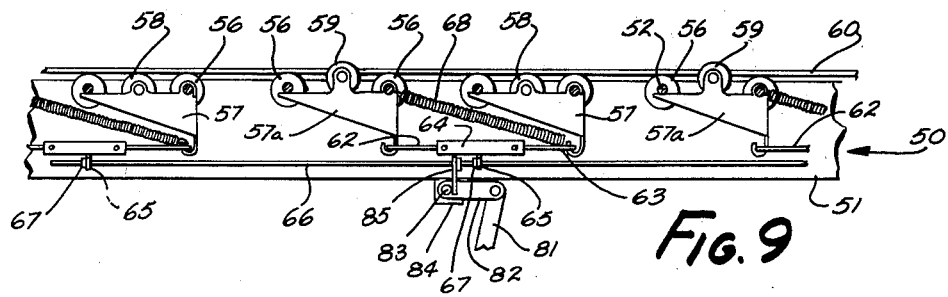
FIG. 9 is a fragmentary sectional elevational view taken along the plane IX—IX of FIG. 7.

The actuating unit 20a for the conveyor 50 is very similar to the actuating unit 20. It is suspended somewhat further below the frame so that longer attachment bolts 22a are used to secure it. It utilizes the same prime mover and speed reduction unit, if the latter is necessary, together with the same frame 21, sprocket 24, chain 25, guide plate 26 and dog 28. The arm 29a is the same as the arm 29 except for the addition of the bracket 80 (FIG. 12). The bracket 80 substitutes for the bar 34 and actuates the switch 35. The arm 29a is connected to a link 81 which in turn is pivotally connected to a second link 82. The link 82 is fixedly secured to a rock shaft 83. The rock shaft 83 is journaled at each end in brackets 84 which are secured the side frame members 51. The rock shaft 83 has an upstanding finger 85 (FIGS. 7 and 9). The finger 85 has a large clearance hole 85a through which passes the cable 66 (FIG. 10). The cable is also equipped with a stop 86 such that when the actuating unit 20a lowers the link 82, bearing between the finger 84 and the stop 86, will move the cable 66 to the right as the assembly is illustrated in FIGS. 7 and 9. The actuated or depressed position of the linkage is illustrated in phantom in FIG. 8.

Figure 6:
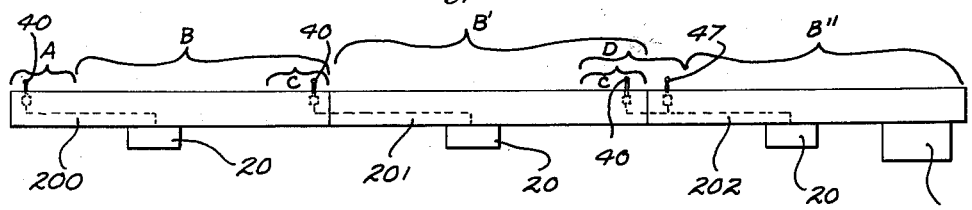
FIG. 6 is a side elevational view, somewhat schematic, of this invention applied to a conveyor system.

It will be understood that the conveyor illustrated in FIG. 7 has a zone at its discharge end comparable to the zone A illustrated in FIG. 6 in which the belt 60 is held permanently in an article propelling position. This may be done by the utilization of hangers 57 which are fixed in position against pivotal movement about the axles 52. It may also be done by replacing the hangers 57 and simply supporting the belt on wheels such as the conveyor wheels 58 mounted directly on the axles 52 in this zone.

Throughout the rest of the length of the conveyor, the propelling belt 60 is supported in article propelling position by the hangers 57 and their wheels 58. As articles pass along the conveyor, they successively pass over and depress the sensing wheels 59 of one operating unit after another. In so doing, they cause the hanger 57 of the affected operating unit to move downwardly. The affected hanger is upstream of or behind the article, lowering the belt to create a zone in which there is no propelling force to be applied to any article which is immediately behind the particular article actuating the operating unit. As the article progresses along the conveyor, the affect of the article is transferred from one operating unit to another. Should the forward progress of the article be blocked, the zone immediately behind the article automatically will prevent the next following article from impacting or colliding into it. Then the article next entering the area will also be blocked by a repetition of the same situation since the last article to be stopped creates a similar zone behind it.

Under normal circumstances, this will effectively permit the entire conveyor to be loaded with stationary articles even though the propelling member is under constant power. Only the lead article in zone A will be under power, the rest of them will have been disengaged by the conveyor belt.

However, when handling very lightweight articles, it sometimes happens that the articles do not impose sufficient weight upon the sensing wheels 59 to effect depression of one or more of the operating units. When this occurs, the belt remains operatively engaged to the following article and propelling pressure or line pressure continues to be applied to the article. This invention prevents this situation.

When an article comes to rest for any reason in zone A and thereby for a definite time interval actuates the switch 40, the actuating mechanism 20a goes into action. As in the case of the actuating unit 20, the motor moves the dog 28 to a position where the arm 29a is depressed. At this point the motor is stopped. The depressed arm 29a swings the rock arm 83 clockwise, as indicated in FIGS. 7, 8 and 9, shifting the cable 66 to the right or upstream. By reason of the stops 67, this automatically lowers all of the operating units, disengaging the belt from the articles throughout the remainder of the conveyor or at least that part of the conveyor affected by cable 66. Thus, any of the operating units which are hung up or have not been moved to lower the belt for any reason automatically are shifted to belt lowering position.

When the article in zone A or the discharge end of the conveyor is freed to move on, the switch 40 once more is opened and the motor driving the actuating unit 20a is reactivated, moving the dog 28 to inoperative position. This permits the cable 66 to shift once more to the left, freeing all of the operating units to bias the belt upwardly.

Normally when this occurs, the articles will start to move one by one, since the operating units will only shift the belt upwardly into operating position in successive order as the articles imposed on their sensing wheels 59 move on and release the sensing wheels. Because of the time delay device, the passage of the articles one by one in normal progression over the switch 40 will not activate the actuating unit 20a since the switch 40 will not be depressed long enough to cause the time delay unit to generate a signal.

It will be recognized that in the discharge end or zone A the belt 60 may be supported by hangers 57 biased upwardly by springs such as the spring 68 but the hanger will not be operatively connected to a hanger 57a and thereby it will not be affected by the passage of articles along the conveyor. Also, it will not be attached to the cable 66 and, thus, is not affected by it.

It will also be recognized that with a conveyor of this type, throughout that portion of the conveyor in which the cable 66 is operative, the hangers 57a and their sensing wheels 59 can be eliminated and the belt supported solely by the hangers 57. In this case the dropping of the belt to depressed and inoperative position will be effected solely by the operation of the actuating unit 20a. Each of the separate conveyor sections will be provided with its own actuating unit 20. In this situation a somewhat different arrangement of the switches is practiced (FIG. 6). Assuming that the articles are moving to the left, as indicated by the arrow in FIG. 6, the zone A of the conveyor 200 is the same as has been previously described. This disengages the propelling member in the remainder of the conveyor section indicated by zone B. This includes that portion of the propelling member in the right-hand or receiving end of the conveyor section 200 designated as zone C. Another switch 40 is provided in zone C.

The switch 40 in zone C of conveyor 200 controls the engagement of the propelling member with articles in zone B' which constitutes all of the intermediate conveyor section 201 including its discharge end and the zone C of this conveyor section. At the right-hand or receiving end of the intermediate conveyor section 201, another zone C is provided identical to the one in the conveyor section 200. It also has a switch 40 which controls the engagement of the propelling member with articles in zone B" of conveyor section 202. However, since zone B" represents the first of the conveyor sections equipped with this invention into which articles will be introduced, a second control switch 47 is necessary. The switch 47 is located in the downstream or discharge end of zone B" of conveyor section 202. These two switches are both included in the zone D which embraces the receiving end of conveyor 201 and the discharge end of conveyor 202.

Figure 13:
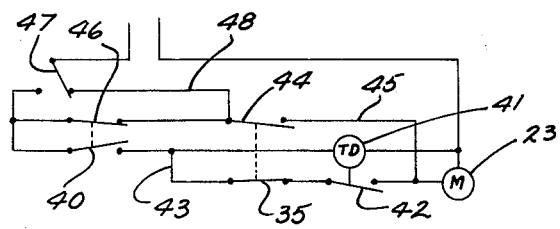
FIG. 13 is a schematic wiring diagram for the switch arrangement in zone D of FIG. 6.

The purpose of switch 47 is to assure loading of the zone B" of conveyor section 202 even though its operation would normally be halted by an article resting on switch 40 in zone C on conveyor section 201. For this purpose the switch 47 has two poles (FIG. 13) one of which closes the circuit to switches 40 and 46 and the other to a circuit 48 which bypasses switch 46. Switch 47 is biased to normally close the bypass circuit 48. Thus, when an article closes switch 40 in zone C of conveyor section 201, the motor 23 serving zone B" will not operate, because the circuit serving switch 40 is open. However, when another article comes to rest on switch 47, the motor 23 serving zone B" will be actuated, because this will move switch 47 to the opposite pole, closing the circuit feeding the now closed switch 40. When the motor has moved the actuator to fully depressed position, switch 35 will open and switch 44 will close. This interrupts the circuit including switch 40, stopping the motor because both the bypass circuit 48 and switch 46 are open. The motor will not operate again until switch 40 is released, closing switch 46 supplying power through the circuit 45.

This arrangement allows articles to move onto the conveyor in zone B" even though an article is resting on the switch in zone C of conveyor section 201. However, build up of line pressure from this operation is automatically prevented by actuation of the switch 46. The actuation of the switch 46 by articles passing over it, when switch 40 is not depressed, will have no effect, since the bypass circuit is separated from the motor by the open switch 44. The time delay device 41 prevents momentary, simultaneous actuation of the switches from operating the motor.

The location of the zones C in the effective area of the conveyor section ahead of the section controlled by the switch in zone C assures positive operation. By this arrangement, the switch in each of the zones C will positively be cleared of articles by the downstream conveyor section, the operation of which is independent of that of the zone controlled by the switch in the affected zone C. Should the conveyor be "slugged" with articles behind a zone C, the zone C will be cleared and a space created between the article which initially stopped in zone C and those upstream from it. This will occur by reason of the delay resulting from the time it takes the initial article to move off the switch in zone C and for the actuator for the upstream zone B to restore power to the articles.

Each of the separate conveyor units may be powered by a separate prime mover and drive assembly 100 or a single drive assembly may be used to drive the entire conveyor. This is possible since this invention permits the propelling unit to be driven continuously with the propelling member being disengaged from driving position in the areas where line pressure is being built up by the accumulation of articles. The mechanism by which power can be transferred from one length of power conveyor to another is not illustrated since this is conventional practice and any of several well-known means for this purpose may be employed.

Where several of the conveyors are arranged in tandem, the time delay mechanisms may be set for different intervals in each conveyor. For example, the time delay connected to the switch 40 of the conveyor farthest downstream may be set to have the shortest interval and the time delay mechanisms of each successive conveyor upstream may have longer time intervals. For example, these intervals may be two, five and ten seconds each, respectively. This will permit the conveyors to become reasonably well loaded with articles without building up any appreciable line pressure.

In a conveyor constructed according to this invention, positive movement of the articles is assured even though the articles move over one of the switches 40 in close pack arrangement. The movement of articles in close pack or slugged line formation will depress one of the switches 40 long enough to trigger the actuator. However, since the article then resting on the switch is always subject to propelling force, it will be moved off the switch. As soon as this happens, the propelling force will be restored to the articles in the affected B zone and movement will be restored. Thus, this invention will operate to space articles which are received in close pack arrangement.

It will be seen that this invention provides a conveyor which prevents the build up of line pressure even though articles are accumulated in large numbers on the conveyor. It also assures positive operation of the mechanism which disengages the propelling member from driving position even though the articles involved are extremely light and, therefore, not likely to activate conventional sensing and detecting mechanisms utilized for this purpose.

It will be understood that many variations may be made in the particular structure of the conveyor and in its arrangement without departing from the principles of this invention. While there has been described a preferred embodiment of this invention as applied both to a power roll conveyor and to a conveyor having a narrow central propelling belt, numerous other modifications of this invention may be made. Each of these modifications is to be considered as included in the hereinafter appended claims unless these claims, by their language, expressly state otherwise.

I claim:

1. In a conveyor for articles having a plurality of driven rollers forming an article transporting surface, a power driven propelling member beneath said rollers and a plurality of pressure rollers beneath said propelling member; said conveyor being characterized by a first zone and a second zone; said first zone being at the discharge end of said conveyor and of a length to accommodate at least a portion of one article; said second zone being adjacent thereto and adapted to discharge articles into said first zone; said pressure rollers in said first zone being fixedly supported to hold said propelling member in driving engagement with said driven rollers; means supporting said pressure rollers in said second zone for vertical movement, said pressure rollers in one position holding said member in driving engagement with said driven rollers and in another position disengaged from said driven rollers; a sensing element adjacent the discharge end of said first zone, said sensing element being positioned to be actuated by articles moving over said driven rollers; an actuator operatively connected to said means for moving said means and pressure rollers to shift said propelling member out of engagement with said driven rollers when said sensing element is actuated; a time delay element interconnected with said sensing element and said actuator whereby said actuator will become operative only after the lapse of a predetermined time interval after said sensing element has been actuated.

2. In a conveyor for articles having a plurality of driven rollers forming an article transporting surface, a power driven propelling member beneath said rollers and a plurality of pressure rollers beneath said member; said conveyor being characterized by a first zone and a second zone; said first zone being at the discharge end of said conveyor and of a length to accommodate at least a portion of one article; said second zone being adjacent thereto and adapted to discharge articles into said first zone; said pressure rollers in said first zone being fixedly supported to hold said propelling member in driving engagement with said driven rollers; said pressure rollers in said second zone, along one side of said conveyor, being supported against downward movement; a rail along the other side of said conveyor supporting the other end of said pressure rollers in said second zone; resilient means biasing said rail upwardly, lifting said pressure rollers to urge said propelling member into driving engagement with said driven rollers; an actuator operatively secured to said rail for moving said rail downwardly against said resilient means and thereby disengaging said propelling member from said driven rollers; an article sensing element in said first zone adapted to be actuated by an article superimposed thereon; said sensing element being operatively connected to said actuator for causing said actuator to move said rail downwardly when said sensing element is actuated.

3. A conveyor as described in claim 2 wherein there is provided a time delay element interconnected between said sensing element and said actuator whereby said actuator will become operative only after the lapse of a predetermined time interval after said sensing element has been actuated.

4. In a conveyor for articles having a plurality of driven rollers forming an article transporting surface, a power driven propelling member beneath said rollers and a plurality of pressure rollers beneath said member; said conveyor being characterized by a first zone and a second zone; said first zone being at the discharge end of said conveyor and of a length to accommodate at least a portion of one article; said second zone being adjacent thereto and adapted to discharge articles into said first zone; said presure rollers in said first zone being fixedly supported to hold said member in driving engagement with said driven rollers; said pressure rollers in said second zone, along one side of said conveyor, being supported against downward movement; a rail along the other side of said conveyor supporting the other end of said pressure rollers in said second zone; resilient means urging said rail upwardly and said pressure rollers and member into driving engagement with said driven rollers; a linkage depending from said rail, said linkage having an arm one end of which is mounted on a stationary pivot and the other end is vertically movable with said rail; an actuator having a prime mover and travelling member movable by said prime mover through an endless path; a dog on said travelling member, in one position said dog engaging said arm and moving it downwardly together with said linkage and rail whereby said propelling member is disengaged from said driven rollers; an article sensing element in said first zone adapted to be actuated by an article superimposed thereon; said sensing element being operatively connected to said prime mover for causing said prime mover to bring said dog into arm depressing position; means for interrupting the operation of said prime mover when said dog has depressed said arm, said interruption means remaining operative until said sensing element is released.

5. A conveyor as described in claim 4 wherein there is provided a time delay element interconnected between said sensing element and said prime mover whereby said prime mover will become operative only after the lapse of a predetermined time interval after said sensing element has been actuated.

6. In a conveyor for articles having an article conveying surface characterized by a medial lane having on each side article conveying lanes equipped with low friction article support elements, the top surfaces of said article support elements collectively forming an article support surface; a power driven article propelling member in said medial lane; said conveying surface lengthwise of said conveyor having a first zone and a second zone, said first zone being at the discharge end of said conveyor and of a length to accommodate at least a portion of one article; said second zone being adjacent thereto and adapted to discharge articles into said first zone; a support for said propelling member in said first zone fixedly holding said propelling member in article contacting and propelling position; in said second zone, a plurality of individual support elements beneath said propelling member spaced apart lengthwise of said conveyor and vertically movable to shift said propelling member from an article engaging, raised position substantially flush with said conveying surface to a lowered position out of engagement with articles on said conveying surface; connecting means joining all of said support elements in said second zone and shiftable to move said support elements to lowered position; an independent prime mover having a power supply, said prime mover being connected to and actuating said connecting means for moving said support elements; a power interrupter in the power supply for said prime mover; an article sensing element in said first zone adapted to be actuated by an article superimposed thereon; said sensing element being connected to said power interrupter for closing it; said prime mover when said power interrupter is closed being activated and moving said connecting means and supporting elements to lowered position; a time delay element interposed between said sensing element and said power interrupter for delaying the closing of said power interrupter until more than one article has actuated said sensing element.

7. A conveyor as described in claim 6 wherein resilient biasing means is provided urging said supporting elements into raised position, said prime mover moving said supporting elements downwardly against the bias of said biasing means.

8. A conveyor as described in claim 6 wherein a second power interrupter is provided; said second power interrupter opening and interrupting the power supply to said prime mover when said supporting elements are in their lowered position; said second power interrupter being connected to said sensing element and being closed when said sensing element is released by an article; said second power interrupter upon closing activating said prime mover to move said supporting elements to raised position.

9. A conveyor as described in claim 6 wherein said prime mover has a cam member connected thereto and said connecting means has a link thereon operatively engaging said cam member and movable by said cam member when said prime mover is actuated; a resilient element biasing said link into engagement with said cam member.

10. A conveyor as described in claim 6 wherein resilient biasing means is provided urging said supporting elements into raised position; said prime mover moving said supporting elements downwardly against the bias of said biasing means; said prime mover having a cam member connected thereto and said connecting means having a link thereon operatively engaging said cam member and movable by said cam member when said prime mover is actuated; said resilient biasing means acting through said connecting means to bias said link into engagement with said cam member.

11. In a conveyor for transporting articles, said conveyor having an article supporting track and a power driven propelling member for moving articles along said track; a first prime mover having a power supply for driving said propelling member; supporting elements for said propelling member, said supporting elements being shiftable for supporting said propelling member in article propelling and article non-propelling positions; means for shifting said supporting elements; a second prime mover and linkage means connecting said second second prime mover to said shifting means for shifting said supporting elements; a sensing element adapted to be actuated by articles moving along said conveyor, a first interruption means in the power supply for said second prime mover; said sensing element being operatively connected to said first interruption means for controlling the actuation of said second prime mover; said sensing element when actuated by an article closing said first interruption means and activating said second prime mover to shift said supporting elements to propelling member non-propelling position, said propelling member when so moved being spaced from the article actuating said sensing element; a time delay element interposed between said sensing element and said first interruption means for delaying the closing of said first interruption means until more than one article has had normal time to pass over said sensing element.

12. A conveyor as recited in claim 11 wherein second power interruption means is provided for stopping said second prime mover while said sensing element is actuated by an article after said second prime mover has shifted said supporting elements to propelling member non-propelling position, said second prime mover when so stopped holding said support elements in propelling member non-propelling position.

13. In a conveyor for transporting articles, said conveyor having an article transporting surface and a power driven propelling member for contacting and moving articles along said article transporting surface; a first prime mover for driving said propelling member; vertically movable supporting elements supporting said propelling member, said supporting elements being movable from a raised attitude for supporting said propelling member in article contacting and propelling position to a lowered attitude for supporting said propelling member in article disengaged non-propelling position; means for moving said supporting elements; a second prime mover having a power supply, said second prime mover connected to said means for actuation thereof; a first interruption means in the power supply for said second prime mover; a sensing element adapted to be actuated by articles moving along said conveyor, said sensing element being operatively connected to said first interruption means for controlling the actuation of said second prime mover; said sensing element when actuated by an article closing said first interruption means for activating said second prime mover to lower said supporting elements to said lower attitude, the propelling member supported on said lowered supporting elements being spaced lengthwise of the conveyor from the article actuating said sensing element; a second power interruption means for stopping said second prime mover while said sensing element is actuated by an article after said second prime mover has moved said supporting elements to lowered attitude; said second prime mover when so stopped holding said supporting elements in said lowered attitude.

References Cited in the file of this patent

UNITED STATES PATENTS

| | | |
|---|---|---|
| 1,903,732 | Walter | Apr. 11, 1933 |
| 2,599,220 | Bergmann | June 3, 1952 |
| 2,827,153 | Olk | Mar. 18, 1958 |
| 2,895,593 | McKnight | July 21, 1959 |
| 2,985,278 | McKnight | May 23, 1961 |
| 3,000,489 | Poel | Sept. 19, 1961 |

UNITED STATES PATENT OFFICE
CERTIFICATE OF CORRECTION

Patent No. 3,156,345                             November 10, 1964

Maynard J. De Good

It is hereby certified that error appears in the above numbered patent requiring correction and that the said Letters Patent should read as corrected below.

Column 4, line 6, for "roil" read -- rail --; line 63, for "depressing" read -- depressed --; column 11, line 61, after "it" insert -- when said sensing element is actuated --.

Signed and sealed this 17th day of August 1965.

(SEAL)
Attest:

ERNEST W. SWIDER                          EDWARD J. BRENNER
Attesting Officer                             Commissioner of Patents